United States Patent
Bush et al.

(10) Patent No.: US 7,264,040 B2
(45) Date of Patent: Sep. 4, 2007

(54) EXHAUST GAS HEAT EXCHANGER AND BYPASS ASSEMBLY

(75) Inventors: Phillip David Bush, Lincoln (GB); Richard Thèvenon, Beaumont (FR)

(73) Assignee: ET US Holdings LLC, Wilmington, DE (US)

( * ) Notice: Subject to any disclaimer, the term of this patent is extended or adjusted under 35 U.S.C. 154(b) by 362 days.

(21) Appl. No.: 10/769,620

(22) Filed: Jan. 30, 2004

(65) Prior Publication Data

US 2004/0251012 A1 Dec. 16, 2004

(51) Int. Cl.
*F28F 27/02* (2006.01)
*F28D 7/10* (2006.01)

(52) U.S. Cl. .................. 165/103; 165/158; 165/159

(58) Field of Classification Search .............. 165/51, 165/81–82, 103, 157–159, 173, 176, DIG. 51–DIG. 54, 165/DIG. 56, DIG. 109; 60/287–289, 298; 123/568.12
See application file for complete search history.

(56) References Cited

U.S. PATENT DOCUMENTS

| | | | | |
|---|---|---|---|---|
| 1,539,267 | A * | 5/1925 | Muhleisen | 165/143 |
| 3,751,917 | A * | 8/1973 | Garcea | 60/288 |
| 3,814,589 | A * | 6/1974 | Heitland | 422/115 |
| 5,101,892 | A * | 4/1992 | Takeuchi et al. | 165/158 |
| 5,148,858 | A * | 9/1992 | Ovretveit | 165/282 |
| 6,141,961 | A * | 11/2000 | Rinckel | 60/288 |
| 6,302,191 | B1* | 10/2001 | Wickham et al. | 165/103 |
| 6,729,122 | B2* | 5/2004 | Watanabe et al. | 60/278 |
| 6,807,955 | B2* | 10/2004 | Leedham et al. | 123/568.12 |
| 2003/0015184 | A1 | 1/2003 | Klipfel et al. | |
| 2003/0111211 | A1* | 6/2003 | Stonehouse et al. | 165/103 |
| 2003/0150434 | A1* | 8/2003 | Leeham et al. | 123/568.12 |
| 2004/0107949 | A1* | 6/2004 | Miyoshi et al. | 123/568.12 |

FOREIGN PATENT DOCUMENTS

| | | |
|---|---|---|
| CA | 2 273 698 | 12/2000 |
| DE | 296 11 034 | 10/1997 |
| DE | 297 14 478 | 10/1997 |
| WO | WO 01/50047 | 7/2001 |

OTHER PUBLICATIONS

European Search Report, May 19, 2004.

* cited by examiner

*Primary Examiner*—Tho Duong
(74) *Attorney, Agent, or Firm*—Carlson, Gaskey & Olds (57) ABSTRACT

An exhaust gas heat exchanger and bypass has an intake manifold, an outlet manifold, a duct for a heat exchanger, and a bypass duct. The heat exchanger duct and the bypass duct run in parallel between the intake manifold and the outlet manifold and are sealingly connected to the outlet manifold. The heat exchanger is arranged in the interior of the heat exchange duct such that the intake side of the heat exchanger is sealingly connected to the heat exchanger duct and the outlet side of the heat exchanger is slideably received in the heat exchanger duct to allow thermal expansion of the heat exchanger relative to the heat exchanger duct.

27 Claims, 5 Drawing Sheets

EXHAUST GAS HEAT EXCHANGER AND BYPASS ASSEMBLY

REFERENCE TO RELATED APPLICATIONS

The present invention claims the benefit of German Patent Application No. 103 03 910.4, filed Jan. 31, 2003.

TECHNICAL FIELD

The present invention relates to an assembly comprising an exhaust gas heat exchanger and a bypass, particularly for an auxiliary heater.

BACKGROUND OF THE INVENTION

Vehicles using high-efficiency internal combustion engines often incorporate an auxiliary heater. These engines, due to their high efficiency, produce very little waste heat that is available for the heating system of the motor vehicle. The small amount of thermal energy that results, if used alone to heat the passenger compartment, is often uncomfortable for the vehicle occupant. Therefore, vehicles may contain a heat exchanger in the exhaust gas line of the vehicle so that heat from the exhaust gas flow can be used to heat the interior of the vehicle.

This type of system generally has a flow route passing through the heat exchanger and a bypass that runs parallel to the flow route. In this manner, the heat exchanger can be switched off. For example, exhaust gas may be directed through the bypass instead of through the flow route immediately after the internal combustion engine is started until a catalytic converter arranged in the exhaust gas line is to be brought to its operating temperature. If the exhaust gas were allowed to flow through the heat exchanger instead of the bypass, it would take longer for the catalytic converter to reach its operating temperature because the heat exchanger has a large thermal capacity and would therefore absorb heat meant to reach the catalytic converter.

Problems caused by thermal expansion among various component parts occurs in virtually all heat exchangers disposed in the exhaust gas line of a vehicle. For one thing, the component parts are exposed to temperature differentials of many hundreds of degrees Celsius. Moreover, there is often a steep temperature gradient between the various component parts even when the operating state is constant. Ideally, the various thermal expansions are reliably absorbed over a multiplicity of operating cycles and prevent leakage from occurring in the exhaust gas line, but as a practical matter this does not occur in currently known heat exchanger assembly designs. Thus, the differing thermal expansions of the various components causes stress among the components, potentially causing leakage.

There is a desire for a simple heat-exchanger housing design that can be manufactured in a cost-effective manner while simultaneously permitting the various thermal expansions of the various component parts without causing any leakage.

SUMMARY OF THE INVENTION

One embodiment of the present invention is directed to an assembly comprising a exhaust gas heat exchanger and a bypass. The assembly has an intake manifold, an outlet manifold, a duct for a heat exchanger, and a bypass duct. The heat exchanger duct and the bypass duct run in parallel between the intake manifold and the outlet manifold and are sealingly connected to the outlet manifold. A heat exchanger is disposed in the interior of the heat exchanger duct. The intake side of the heat exchanger is sealingly connected to the heat exchanger duct and the outlet side of the heat exchanger is displaceably received in the heat exchanger duct so that a thermal expansion of the heat exchanger is possible relative to the heat exchanger duct.

The assembly according to one embodiment of the invention is based on the fundamental idea of providing a closed duct for the exhaust gas heat exchanger. The heat exchanger is attached on its intake side to the duct in a fixed and sealing manner by, for example, welding. The outlet side of the heat exchanger is received in the heat exchanger duct to be freely displaceable. As a result, the heat exchanger can freely expand in the interior of the heat exchanger duct, and stresses due to differing thermal expansions of the component parts cannot arise. The external duct provides the necessary mechanical stability and tight sealing of the exhaust gas line.

In one embodiment, the assembly includes an intake adapter with an integral flap valve. The intake adapter is arranged between the intake manifold, on the one hand, and the bypass duct and the heat exchanger duct, on the other hand. The flap valve is actuated by external parameters to divide the exhaust gas flow between the two ducts. The flap valve therefore can provide any conceivable division of the flow volume between the two ducts.

In one embodiment, the heat exchanger duct comprises an intake cone, a straight heat exchanger tube, and an outlet cone. The heat exchanger at its intake side is welded to the intake cone, whereas the outlet side of the heat exchanger is movably received in the outlet cone. The heat exchanger tube is welded both to the intake cone as well as to the outlet cone. Radial play between the outlet side of the heat exchanger and the outlet cone permits the thermal expansion of the heat exchanger in every direction while at the same time forming a very small flow cross-section that prevents a return flow of the exhaust gas into the space between the heat exchanger tube and the heat exchanger.

In one embodiment, an annular gap between the interior side of the heat exchanger tube and the exterior side of the heat exchanger is filled with packing made of thermally insulating fibrous material. The packing thermally insulates the heat exchanger so that losses due to thermal radiation to the outside are reduced. At the same time, the packing is kept in a compressed state so that it also functions as a seal.

Advantageous embodiments of the present invention will become apparent from the subclaims.

DETAILED DESCRIPTION OF THE EMBODIMENTS

The present invention is generally directed to an assembly comprising an exhaust gas heat exchanger and a bypass. The assembly has an intake manifold, an outlet manifold, a duct for a heat exchanger, and a bypass duct. The heat exchanger duct and the bypass duct run in parallel between the intake manifold and the outlet manifold and are sealingly connected to the outlet manifold. A heat exchanger is disposed in the interior of the heat exchanger duct. The intake side of the heat exchanger is sealingly connected to the heat exchanger duct and the outlet side of the heat exchanger is displaceably received in the heat exchanger duct so that a thermal expansion of the heat exchanger is possible relative to the heat exchanger duct.

The assembly according to one embodiment of the invention is based on the fundamental idea of providing a closed duct for the exhaust gas heat exchanger. The heat exchanger is attached on its intake side to the duct in a fixed and sealing manner by, for example, welding. The outlet side of the heat exchanger is received in the heat exchanger duct to be freely displaceable. As a result, the heat exchanger can freely expand in the interior of the heat exchanger duct, and stresses due to differing thermal expansions of the component parts cannot arise. The external duct provides the necessary mechanical stability and tight sealing of the exhaust gas line.

According to one embodiment of the present invention, the intake manifold and the outlet manifold are made of deep-drawn, cold-extruded or flow-pressed sheet steel and are designed to have virtually identical structures. This type of design results in especially low manufacturing costs.

According to one embodiment of the present invention, an outlet adapter is disposed between the outlet manifold, on the one hand, and the bypass duct and the heat exchanger duct, on the other hand. This outlet adapter may be made of deep-drawn sheet steel and is welded to the outlet manifold. Incorporating an outlet adapter leads to many advantages in the manufacturing process for the assembly. For one, the outlet adapter makes it possible, with minimal expense, to retain the connections of the bypass duct and the heat exchanger duct to the outlet manifold. Normally, an outlet manifold in which the connections for the bypass duct as well as the heat exchanger duct are configured as integral parts can only be manufactured at a high cost, but the inventive structure overcomes this. Moreover, the outlet adapter provides advantages during assembly; the outlet adapter can be welded to the bypass duct and the heat exchanger duct before the outlet manifold is set in place. The corresponding welding locations are therefore easily accessible even between the two ducts. Subsequently, the outlet manifold can be placed onto the outlet adapter and welded to it. In this case, it is only necessary to execute a circumferential and external, highly accessible, weld.

In one embodiment, the assembly includes an intake adapter that is arranged between the intake manifold, on the one hand, and the bypass duct and the heat exchanger duct, on the other hand. The intake adapter is advantageously a cast metal part in which a flap valve is integrated. The flap valve is actuated due to external parameters, thereby dividing the exhaust gas flow between the two ducts. The flap valve therefore allows any conceivable division of the flow volume between the two ducts. The intake adapter offers the advantage that all the steps carried out in the manufacturing process are integrated in one single component. The intake adapter receives the valve, forms the valve seat for the valve flap, and, just as in the case of the outlet adapter, makes a simple assembly of the entire assembly possible.

In one embodiment of the present invention, the heat exchanger duct comprises an intake cone, a straight heat exchanger tube, and an outlet cone. The intake side of the heat exchanger is welded to the intake cone, whereas the outlet side of the heat exchanger is movably received in the outlet cone. The heat exchanger tube is welded both to the intake cone as well as to the outlet cone. A small amount of radial play (e.g., radial play in the order of 0.2 mm or so) is allowed between the outlet side of the heat exchanger and the outlet cone. This permits thermal expansion of the heat exchanger in every direction while at the same time forming a very small flow cross-section, which prevents return flow of the exhaust gas into the space between the heat exchanger tube and the heat exchanger.

The heat exchanger may include two connecting pieces that extend radially outward and pass through the heat exchanger tube. For this purpose, the heat exchanger tube is provided with two holes, which may be shaped as oblong holes. The connecting pieces and holes may also aid in the unhindered thermal expansion of the heat exchanger.

An annular gap may be provided between the interior side of the heat exchanger tube and the exterior side of the heat exchanger. A packing made of thermally insulating fibrous material may be disposed in the gap. The material thermally insulates the heat exchanger to reduce heat losses to the outside due to thermal radiation. At the same time, the packing between the heat exchanger and the heat exchanger tube may be kept in a compressed state so that it functions as a seal. This prevents leakage flows from the outlet side of the heat exchanger through the gap between the outlet cone and the heat exchanger into the annular space between the heat exchanger and the heat exchanger tube and through the oblong holes to the outside. Due to a Venturi effect in the area of the outlet side of the heat exchanger, a leakage flow in the direction of the oblong holes in the heat exchanger tube is nevertheless not to be expected or in very minor amounts; in this area, it is more likely for outside air to be sucked in.

According to an embodiment of the invention, a sliding seal may be arranged between the outlet side of the heat exchanger and the outlet cone. The sliding seal reliably prevents any leakage flows toward the oblong holes in the tube.

Advantageous embodiments of the present invention will become apparent from the subclaims.

Figure 1:
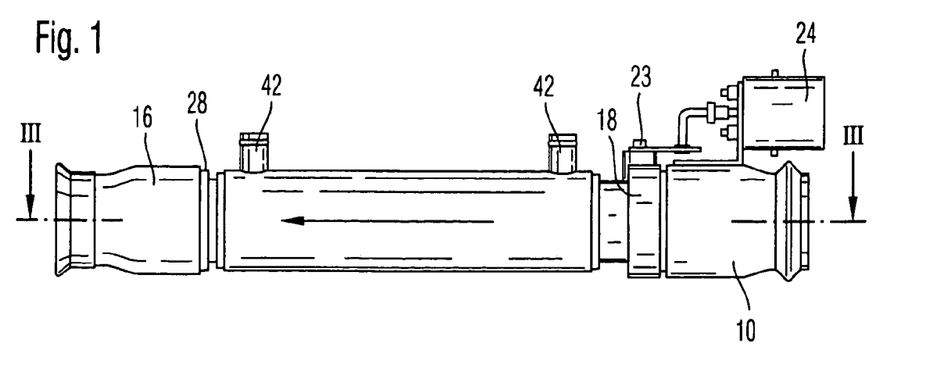
FIG. 1 depicts a side view of an assembly according to one embodiment of the present invention.
Figure 2:
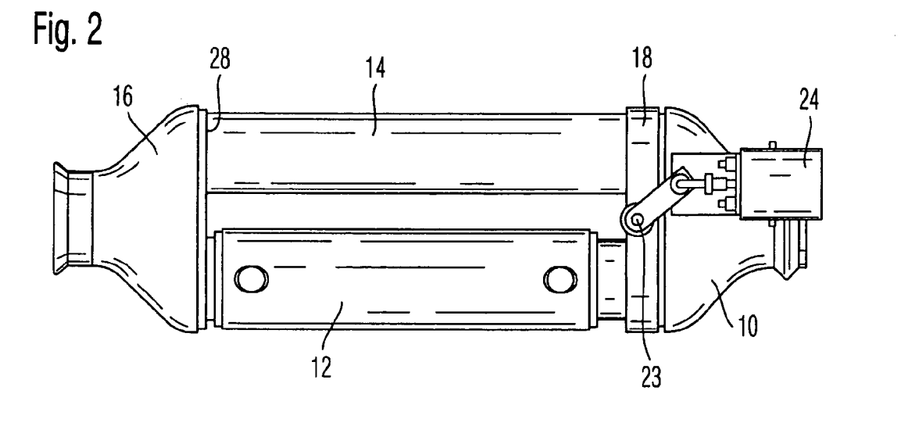
FIG. 2 depicts a top view of the assembly according to one embodiment of the present invention.
Figure 3:
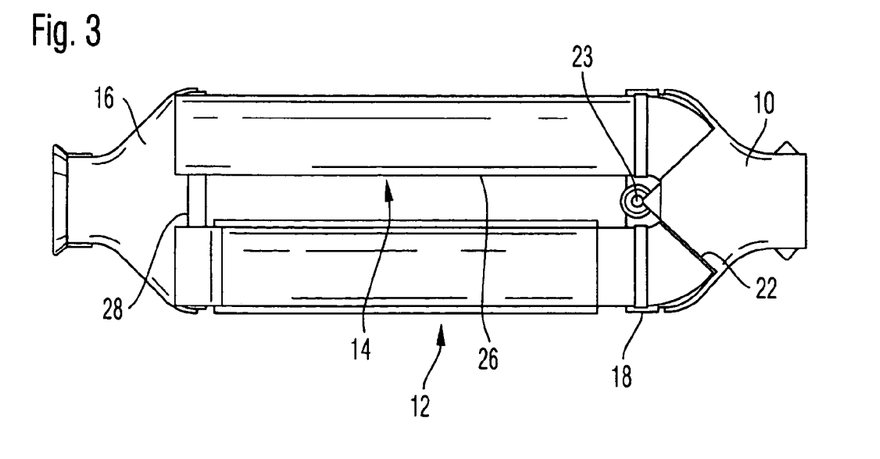
FIG. 3 depicts a sectional view along the plane III-III from FIG. 1.

The invention will now be described in greater detail with respect to the Figures. FIGS. 1 through 3 depict an assembly that has an exhaust gas heat exchanger and a bypass. The assembly is designed to be arranged in the exhaust gas line of a vehicle with the exhaust gas flow passing through the assembly in the direction of the arrow in FIG. 1 (e.g., from right to left in FIG. 1).

The assembly has an intake manifold 10, which may be made of deep-drawn or cold-extruded sheet steel. The intake manifold 10 basically permits the exhaust gas flow to be divided between a heat exchanger duct 12 and a bypass duct 14. The heat exchanger duct and the bypass duct are joined once again by a downstream outlet manifold 16. In one embodiment, the outlet manifold has the same shape as the intake manifold 10.

Figure 4:
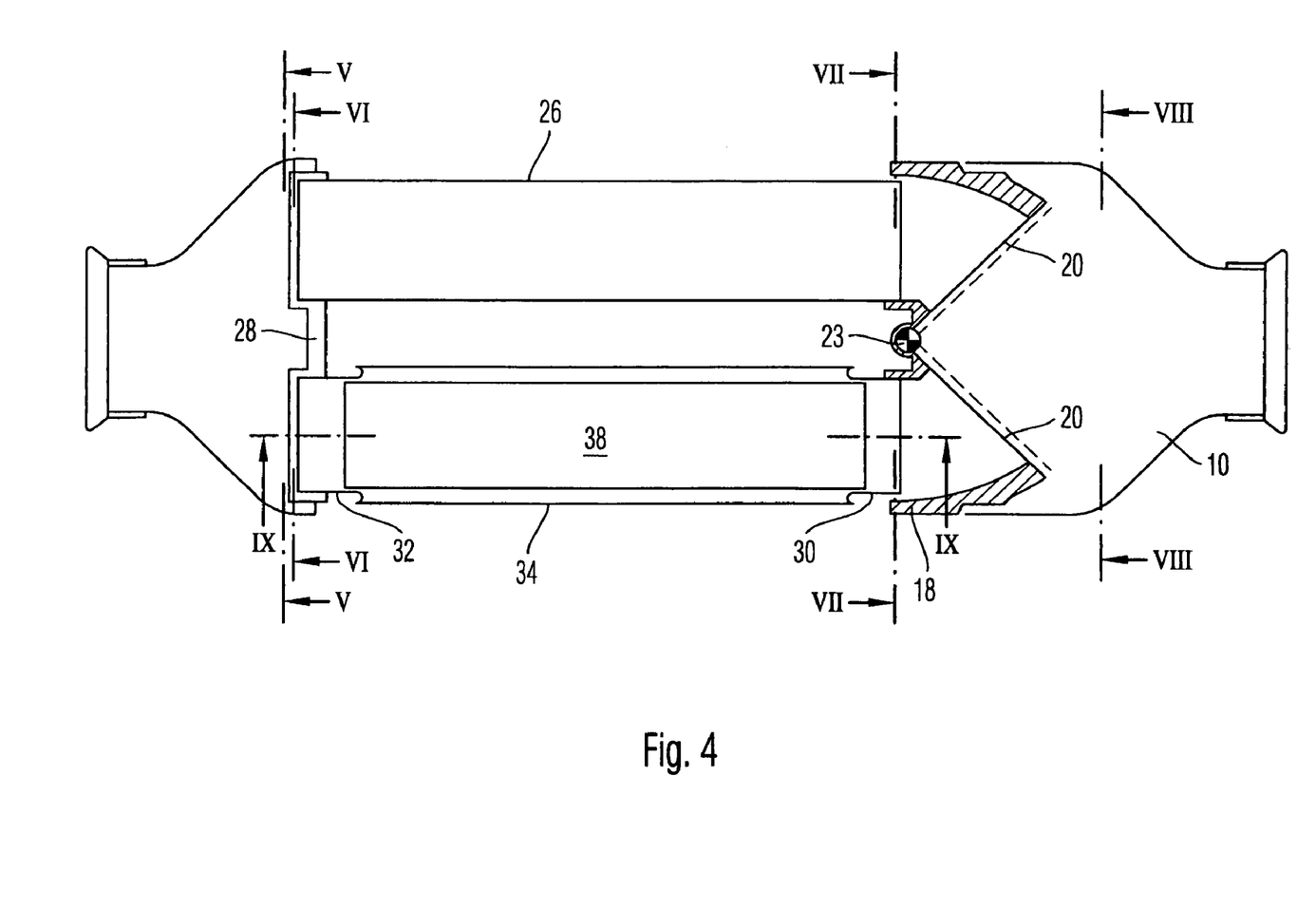
FIG. 4 depicts the sectional view from FIG. 3 in an enlarged view.
Figure 5:
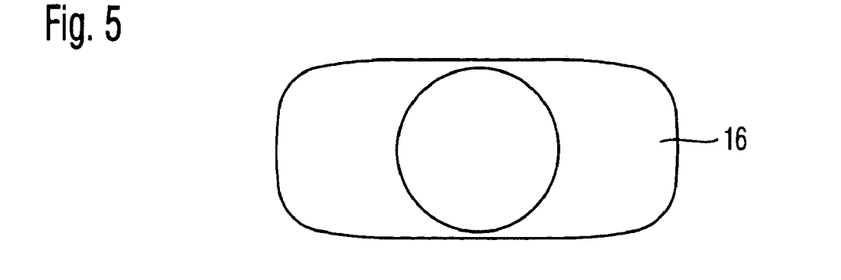
FIG. 5 depicts a sectional view along the plane V-V from FIG. 4.
Figure 6:
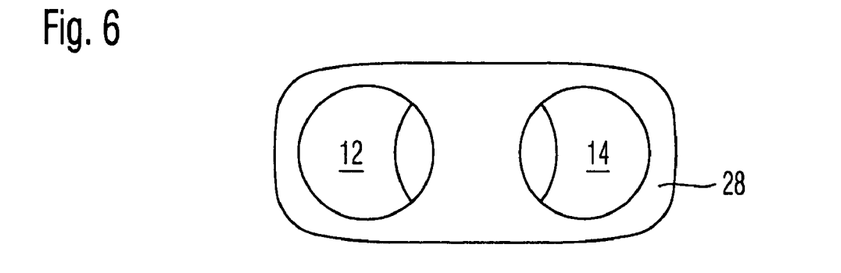
FIG. 6 depicts a sectional view along the plane VI-VI from FIG. 4.
Figure 7:
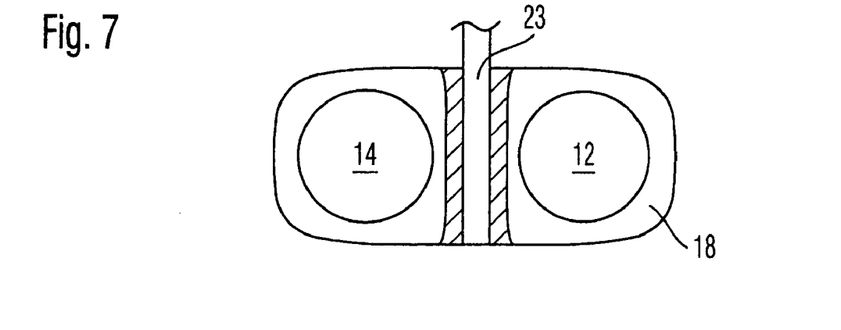
FIG. 7 depicts a sectional view along the plane VII-VII from FIG. 4.
Figure 8:
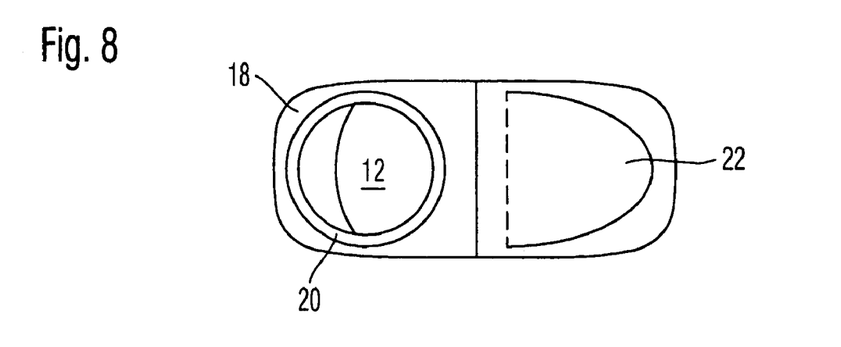
FIG. 8 depicts a sectional view along the plane VIII-VIII from FIG. 4.

An intake adapter 18 is arranged on the outlet side of the intake manifold 10 (see FIGS. 4, 7, and 8). In one embodiment, the intake adapter 18 is a cast metal part and has two valve seats 20 against which a valve flap 22 can cooperate. The valve flap 22 is supported by a valve shaft 23, which is connected to a servo motor 24. If the valve flap 22 contacts the valve seat 20 associated with the heat exchanger duct 12, then the entire exhaust gas flow passes through bypass duct 14. Note that the valve flap 22 can have any number of intermediate positions, making it possible to divide the exhaust gas flow between the two ducts in any desired ratio. The intake adapter 18 is welded or otherwise connected to the intake manifold 10.

The bypass duct 14 comprises a bypass tube 26. The intake adapter 18 is welded or otherwise connected to the intake side of the bypass tube. An outlet adapter 28 is welded or otherwise connected to the outlet side of the bypass tube 26. In one embodiment, the outlet adapter 28 is a stamped and deep-drawn sheet metal part. The outlet adapter 28 acts as a transition from the two circular cross-sections formed by the heat exchanger duct 12 and the bypass duct 14 into the elongated intake cross-section of the outlet manifold 16. The outlet adapter 28 is welded to the outlet manifold 16.

Figure 9:
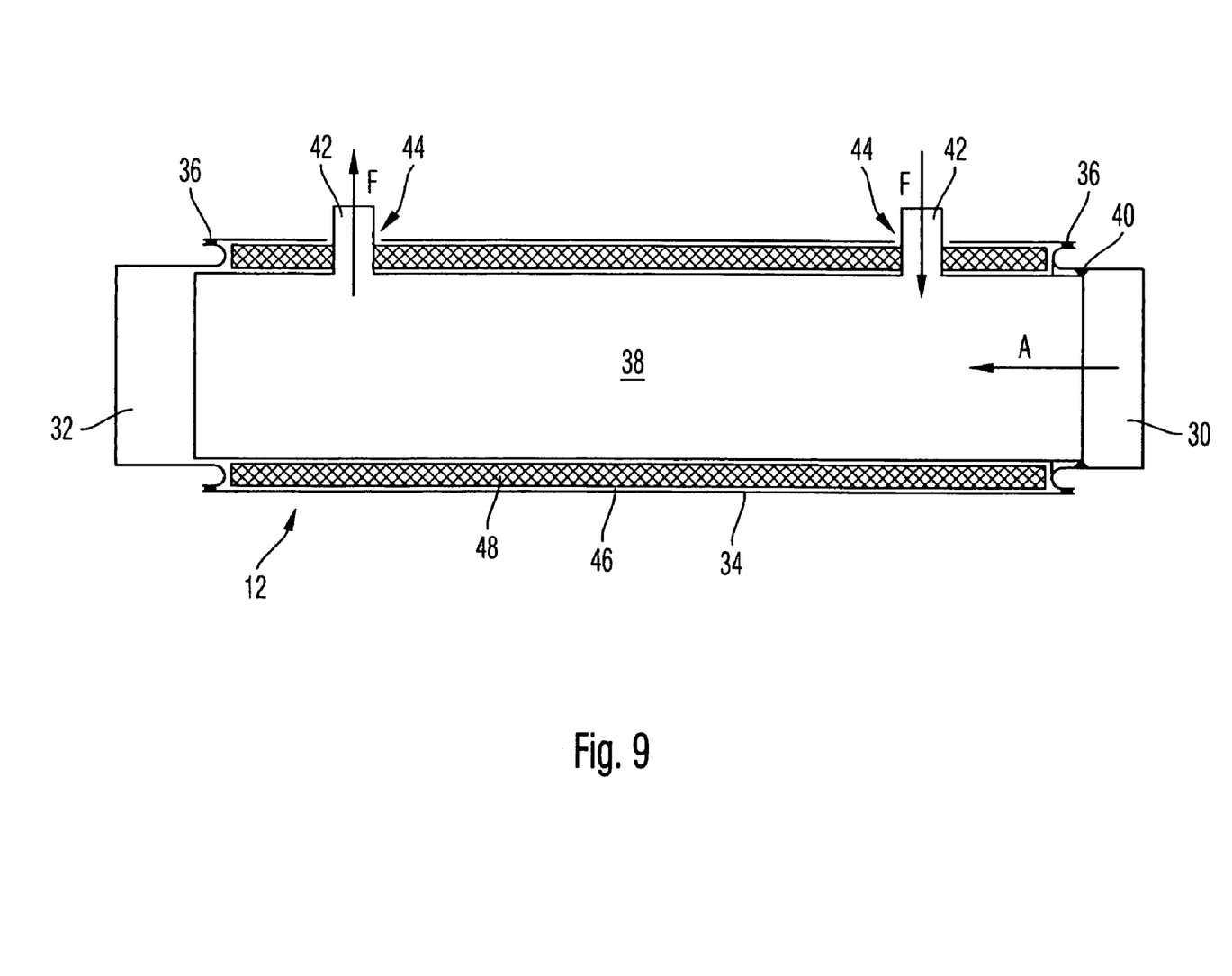
FIG. 9 depicts a sectional view along the plane IX-IX from FIG. 4.

In one embodiment, the heat exchanger duct 12 comprises an intake cone 30, an outlet cone 32, and a heat exchanger tube 34 (see, for example, FIG. 9). The heat exchanger tube 34 is welded or otherwise connected to the intake cone 30 and the outlet cone 32, as is symbolized in this example by welds 36.

A heat exchanger 38 is arranged in the interior of the heat exchanger duct 12, which is formed by intake cone 30, heat exchanger tube 34, and outlet cone 32. The heat exchanger 38 permits exhaust gas to pass through it in the direction of arrow A and also permits a fluid to pass through in the direction of arrows F to achieve a heat transfer from the exhaust gas to the fluid. The interior design of heat exchanger 38 has no significance for understanding the present invention, so it is not discussed further here. The exterior sleeve of the heat exchanger may be made of metal.

The intake side of the heat exchanger 38 is welded or otherwise connected to the intake cone 30. This connection is symbolized in this example by a weld 40. The outlet side of the heat exchanger 38 is loosely placed into the outlet cone 32 to permit a slight radial play between the heat exchanger and the outlet cone 32. If the heat exchanger 38 and the heat exchanger tube 34 expand in varying amounts in response to temperature differences, the radial play prevents undesirable stresses from occurring between the heat exchanger 38 and the heat exchanger tube 34 because the outlet side of heat exchanger 38 can slide freely in the outlet cone 32. The arrangement of the heat exchanger 38 is comparable to a bridge support, in which a fixed support and a flexible support are provided so that the fixed support acts as a component positioner and the flexible support allows relative shifts caused by thermal expansions. In this context, it is of course theoretically possible to secure the heat exchanger in the heat exchanger duct in ways other than a weld.

Figure 11:
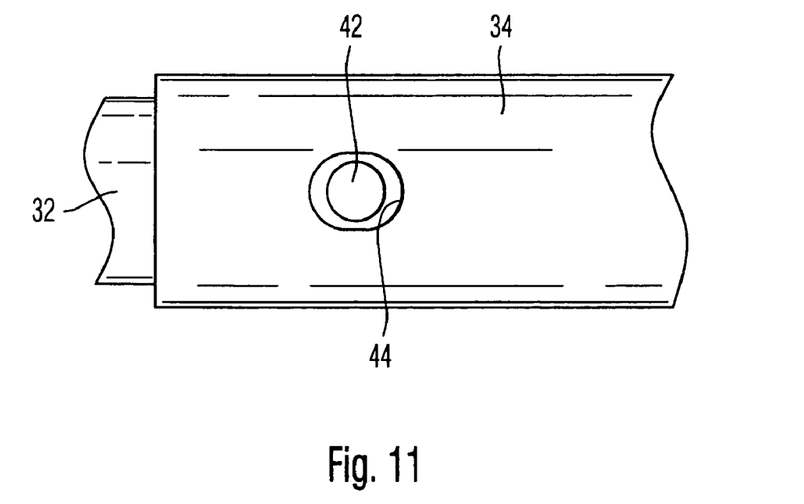
FIG. 11 depicts a top view of the outlet side of the heat exchanger duct.

In the illustrated example, the heat exchanger 38 includes two connecting pieces 42 that supply fluid to and convey fluid away from the heat exchanger 38. Both connecting pieces 42 extend through the heat exchanger tube 34. In one embodiment, each connecting piece extends through a corresponding oblong hole 44 in the heat exchanger tube 34 (FIG. 11). The dimensions of the oblong holes 44 are designed to allow unhindered thermal expansion of the heat exchanger 38.

Figure 10:
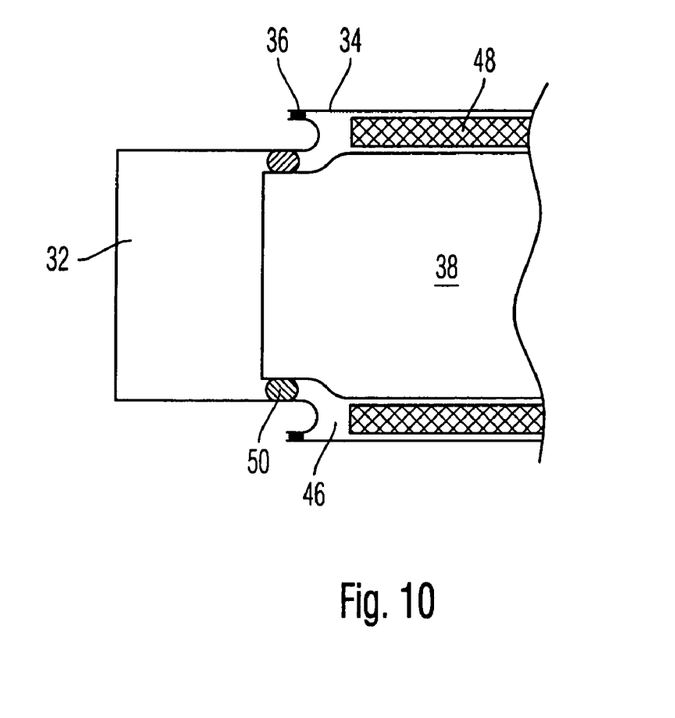
FIG. 10 depicts a broken-off view of a variant of the embodiment shown in FIG. 9.

In one embodiment, there is an annular gap 46 between the exterior side of the heat exchanger 38 and the interior side of the heat exchanger tube 34 (FIGS. 9 and 10). A packing or mat 48 is arranged in this annular gap 46. The packing 48 is made of thermally insulating fibrous material. The packing 48 acts as a thermal insulator for the heat exchanger 38. In addition, the packing 48 prevents rattling noises that may otherwise be generated by movement of the heat exchanger 38 in the outlet cone 32.

The volume of the packing 48 is regulated with regard to the cross-section of annular gap 46 such that the material forming the packing 48 is significantly compressed. In this way, the packing 48 reduces its permeability to gas such that it forms a seal against any potential leakage flow that may escape from the outlet side of the heat exchanger 38 through the annular gap 46 between the heat exchanger 38 and outlet cone 32 into annular gap 46 and through the oblong holes 44 into the exterior environment.

FIG. 10 also shows an optional sealing ring 50 that may be included in the assembly to improve the sealing tightness of the exhaust gas system. The sealing ring 50 is arranged between the outlet side of the heat exchanger 38 and the outlet cone 32. The sealing ring 50 shape and material may be any resilient material that, on the one hand, prevents any leakage flows from reaching the annular gap 46 and through the oblong holes 44 into the exterior environment and, on the other hand, permits the axial expansion of the heat exchanger 38 and the relative motion resulting therefrom with respect to the outlet cone 32.

The inventive assembly therefore has a very simple design, keeping manufacturing costs low. In one embodiment, the bypass tube 26 and the heat exchanger tube 34 are simple, straight tube pieces, which are available as standard parts. The intake manifold 10 and the outlet manifold 16 can be cold-extruded in a cost-effective manner. In addition, they may have identical shapes, which leads to lower unit costs. All design details that cause high manufacturing expenses are combined in one single component part, namely in the intake adapter 18. The intake adapter 18 assures the adjustment of the cross-section of intake manifold 10 to the cross-section of the heat exchanger duct 12 and of the bypass duct 14 and also receives the flap valve through which the flow distribution through the two ducts can be regulated. The assembly according to the invention is also distinguished by the advantageous placement of the heat exchanger 38 in the interior of the heat exchanger duct 12, thereby allowing thermal stresses to be avoided. Altogether, the inventive assembly provides low manufacturing costs while at the same time providing optimal control of the different thermal expansion behaviors of the different component parts.

What is claimed is:

1. An assembly comprising:
    an intake manifold;
    an outlet manifold;
    a heat exchanger duct that comprises an intake cone, an outlet cone, and a heat exchanger tube sealingly connected to the intake cone and the outlet cone;
    a bypass duct, wherein the heat exchanger duct and the bypass duct are each sealingly connected between the intake manifold and the outlet manifold and are disposed substantially parallel to each other; and
    a heat exchanger disposed in the heat exchanger duct to achieve heat transfer from an exhaust gas to a fluid, the heat exchanger having a first end and a second end wherein the first end is sealingly connected to the heat exchanger duct and the second end is slideably received in the heat exchanger duct to allow thermal expansion of the heat exchanger relative to the heat exchanger duct, and wherein an outlet side of the heat exchanger is slideably received in the outlet cone.

2. The assembly as recited in claim 1, further comprising an outlet adapter disposed between the outlet manifold and the heat exchanger duct and the bypass duct.

3. The assembly as recited in claim 2, wherein the outlet adapter is made of deep-drawn sheet steel.

4. The assembly as recited in claim 3, wherein the outlet adapter is connected to the outlet manifold.

5. The assembly as recited in claim 1, further comprising an intake adapter disposed between the intake manifold, and the heat exchanger duct and the bypass duct.

6. The assembly as recited in claim 5, wherein the intake adapter is a cast metal part.

7. The assembly as recited in claim 6, wherein the intake adapter is connected to the intake manifold.

8. The assembly as recited in claim 5, further comprising a valve flap suitably disposed in the intake adapter, wherein the intake adapter has at least one valve seat with which the valve flap cooperates.

9. The assembly as recited in claim 8, wherein the at least one valve seat comprises a first valve seat corresponding to the heat exchanger duct and a second valve seat corresponding to the bypass duct.

10. The assembly as recited in claim 1, including welds between the heat exchanger tube and the intake cone and the outlet cone.

11. The assembly as recited in claim 1, including a weld between an intake side of the heat exchanger and the intake cone.

12. The assembly as recited in claim 1, wherein the outlet cone and the outlet side of the heat exchanger are spaced apart to allow radial play between the outlet cone and the outlet side of the heat exchanger.

13. An assembly comprising:
an intake manifold;
an outlet manifold;
a heat exchanger duct that comprises an intake cone, an outlet cone, and a heat exchanger tube sealingly connected to the intake cone and the outlet cone;
a bypass duct, wherein the heat exchanger duct and the bypass duct are each sealingly connected between the intake manifold and the outlet manifold and are disposed substantially parallel to each other; and
a heat exchanger disposed in the heat exchanger duct to achieve heat transfer from an exhaust gas to a fluid, the heat exchanger having a first end and a second end wherein the first end is sealingly connected to the heat exchanger duct and the second end is slideably received in the heat exchanger duct to allow thermal expansion of the heat exchanger relative to the heat exchanger duct, and wherein the heat exchanger further comprises at least one connecting piece and the heat exchanger tube has at least one hole through which the at least one connecting piece extends, wherein the at least one hole and said at least one connecting piece have a spaced relationship.

14. The assembly as recited in claim 13, wherein said at least one hole is an oblong hole.

15. An assembly comprising:
an intake manifold;
an outlet manifold;
a heat exchanger duct that comprises an intake cone, an outlet cone, and a heat exchanger tube sealingly connected to the intake cone and the outlet cone;
a bypass duct, wherein the heat exchanger duct and the bypass duct are each sealingly connected between the intake manifold and the outlet manifold and are disposed substantially parallel to each other;
a heat exchanger disposed in the heat exchanger duct to achieve heat transfer from an exhaust gas to a fluid, the heat exchanger having a first end and a second end wherein the first end is sealingly connected to the heat exchanger duct and the second end is slideably received in the heat exchanger duct to allow thermal expansion of the heat exchanger relative to the heat exchanger duct, and wherein an annular gap is formed between an exterior side of the heat exchanger and an interior side of the heat exchanger tube; and
a packing disposed in the annular gap.

16. The assembly as recited in claim 15, wherein the packing is a thermal insulator made of a fibrous material.

17. The assembly as recited in claim 15, wherein the packing is compressed between the heat exchanger tube and the heat exchanger to form a seal against at least partial leakage flow into the annular gap.

18. The assembly as recited in claim 1, further comprising a seal disposed between the outlet side of the heat exchanger and the heat exchanger duct.

19. The assembly as recited in claim 1, wherein the intake manifold and the outlet manifold are made of deep-drawn or cold-extruded sheet steel.

20. The assembly as recited in claim 1, wherein the intake manifold and the outlet manifold are substantially identical.

21. The assembly as recited in claim 1, wherein the bypass duct and the heat exchanger duct extend in a straight line.

22. An assembly comprising:
an intake manifold;
an outlet manifold;
a heat exchanger duct that comprises an intake cone, an outlet cone, and a heat exchanger tube sealingly connected to the intake cone and the outlet cone;
a bypass duct, wherein the heat exchanger duct and the bypass duct are each sealingly connected between the intake manifold and the outlet manifold and are disposed substantially parallel to each other;
a heat exchanger disposed in the heat exchanger duct and having an intake side and an outlet side, wherein the intake side is sealingly connected to the heat exchanger duct and the outlet side is slideably received in the heat exchanger duct to allow thermal expansion of the heat exchanger relative to the heat exchanger duct, and wherein the intake side of the heat exchanger is welded to the intake cone and the outlet side of the heat exchanger is slideably received in the outlet cone;
an intake adapter disposed between the intake manifold, and the heat exchanger duct and the bypass duct, wherein the intake adapter is connected to the intake manifold, the intake adapter having a first valve seat corresponding to the heat exchanger duct and a second valve seat corresponding to the bypass duct;
a valve flap suitably disposed in the intake adapter and cooperating with the first and second valve seats in the intake adapter; and
an outlet adapter disposed between the outlet manifold, and the heat exchanger duct and the bypass duct, wherein the outlet adapter is connected to the outlet manifold.

23. The assembly as recited in claim 22, wherein the outlet cone and the outlet side of the heat exchanger are spaced apart to allow radial play between the outlet cone and the outlet side of the heat exchanger.

24. An assembly comprising:
an intake manifold;
an outlet manifold;
a heat exchanger duct;
a bypass duct, wherein the heat exchanger duct and the bypass duct are each sealingly connected between the intake manifold and the outlet manifold and are disposed substantially parallel to each other;
a heat exchanger disposed in the heat exchanger duct and having an intake side and an outlet side, wherein the intake side is sealingly connected to the beat exchanger duct and the outlet side is slideably received in the heat exchanger duct to allow thermal expansion of the heat exchanger relative to heat exchanger duct, and wherein the heat exchanger further comprises two connecting pieces and a heat exchanger tube that has two holes through which the two connecting pieces extend, wherein the two holes and the two connecting pieces have a spaced relationship;
an intake adapter disposed between the intake manifold, and the heat exchanger duct and the bypass duct, wherein the intake adapter is connected to the intake manifold, the intake adapter having a first valve seat corresponding to the heat exchanger duct and a second valve seat corresponding to the bypass duct;
a valve flap suitably disposed in the intake adapter and cooperating with the first and second valve seats in the intake adapter; and
an outlet adapter disposed between the outlet manifold, and the heat exchanger duct and the bypass duct, wherein the outlet adapter is connected to the outlet manifold.

25. The assembly as recited in claim 24, wherein the two holes are oblong holes.

26. The assembly as recited in claim 24, wherein an annular gap is formed between an exterior side of the heat exchanger and an interior side of the heat exchanger tube, and wherein the assembly further comprises a thermally insulating packing disposed in the annular gap,
wherein the thermally insulating packing is compressed between the heat exchanger tube and the heat exchanger to form a seal against at least partial leakage flow into the annular gap.

27. The assembly as recited in claim 22 further comprising a seal disposed between an outlet side of the heat exchanger and the heat exchanger duct.

* * * * *

UNITED STATES PATENT AND TRADEMARK OFFICE
CERTIFICATE OF CORRECTION

PATENT NO. : 7,264,040 B2 Page 1 of 1
APPLICATION NO. : 10/769620
DATED : September 4, 2007
INVENTOR(S) : Bush et al.

It is certified that error appears in the above-identified patent and that said Letters Patent is hereby corrected as shown below:

ON THE TITLE PAGE:

Please insert the following after "(65) Prior Publication Data"

--(30) Foreign Application Priority Data
Jan. 31, 2003    (DE)........................ 10303910.4--

Claim 8, Column 7, line 22: "suitably" should read as --swivably--

Claim 22, Column 8, line 61: "suitably" should read as --swivably--

Claim 24, Column 9, line 15: "beat" should read as --heat--

Claim 24, Column 10, line 4: "suitably" should read as --swivably--

Signed and Sealed this

Eleventh Day of December, 2007

JON W. DUDAS
*Director of the United States Patent and Trademark Office*